March 8, 1960 W. CZERWINSKI 2,927,469
AIRCRAFT CONTROL SURFACE ACTUATING MECHANISM
Filed May 26, 1958 3 Sheets-Sheet 1

INVENTOR
W. CZERWINSKI
BY: Maybee & Legris
ATTORNEYS

March 8, 1960 W. CZERWINSKI 2,927,469
AIRCRAFT CONTROL SURFACE ACTUATING MECHANISM
Filed May 26, 1958 3 Sheets-Sheet 3

INVENTOR
W. CZERWINSKI
BY: Maybee & Legris
ATTORNEYS

United States Patent Office 2,927,469
Patented Mar. 8, 1960

2,927,469

AIRCRAFT CONTROL SURFACE ACTUATING MECHANISM

Waclaw Czerwinski, Toronto, Ontario, Canada, assignor to Avro Aircraft Limited, Malton, Ontario, Canada, a corporation Application May 26, 1958, Serial No. 737,898

6 Claims. (Cl. 74—105)

This invention relates to mechanical linkages in general and to actuating mechanisms for aerodynamic control surfaces in particular.

High speed flight has dictated the use of extremely thin wings and stabilizing surfaces which has given rise to difficulties in the design of actuating mechanisms for aerodynamic control surfaces. These difficulties have been aggravated by the rise in the aerodynamic control moments which must be exerted by these actuating mechanisms, the magnitude of which varies as the square of the velocity of the aircraft. Power operated controls are required to exert the required forces but these control motors must be located close to the aerodynamic control surface which they operate. The actuating mechanism must have a lever arm of suitable length while at the same time it must be confined entirely within the surface of the wing or stabilizing surface as portions of the mechanism projecting into the airstream would increase the drag of the wing and would create undesirable airflow problems.

The space available for control surface actuating mechanism is further reduced by the necessity of carrying as much fuel as possible in the wings. Therefore, it is undesirable to have chordwise control motors which, in addition to occupying space which should be occupied by fuel, require openings in the rear spar of the wing to allow for passage of control rods, etc., as these openings in the rear spar of the wing reduce the strength of the spar and increase the structural problems of wing design. It is, therefore, highly desirable to have all the power control motors and other parts of the control surface actuating mechanism as near to the trailing edge of the wing as possible. With the parts of the control surface actuating mechanism in this preferred location, a linear spanwise motion of a power operated control rod must be converted in a chordwise arcuate motion, and this motion in prior designs is usually obtained by means of bell-cranks and the like which occupy more space than is available in a thin-section wing.

An object of this invention is to provide an aerodynamic control surface actuating mechanism for thin aerofoils and stabilizing surfaces.

Another object of this invention is to provide an aerodynamic control surface actuating mechanism which may be completely confined within the surface of the wing, defined by the true aerofoil section thereof.

Still another object of this invention is to provide an aerodynamic control surface actuating mechanism which may be mounted entirely behind the rear spar of the wing and which requires no openings in the rear spar.

Other objects and advantage of this invention will become apparent to those skilled in the art from reading the following description in conjunction with the accompanying drawings which show a preferred embodiment of the invention and in which like reference characters refer to like parts throughout.

Figure 1:
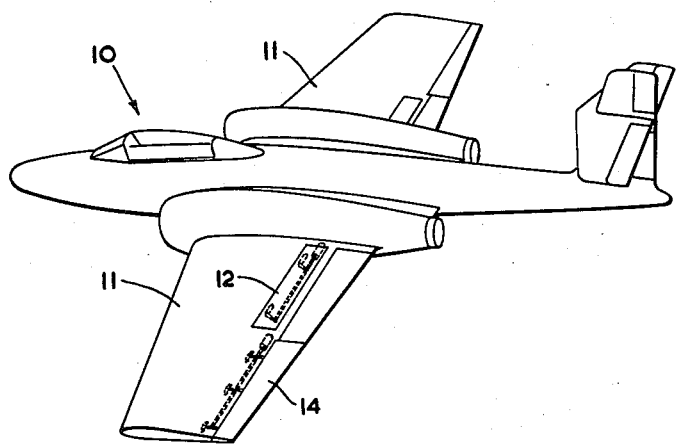
Figure 1 is a perspective view of an aircraft showing the location of the aerodynamic control surfaces actuated by means according to the invention.

The drawings show an aircraft 10 having wings 11 on each of which there is an upper air brake surface 12, a lower air brake surface 13 (not shown in Figure 1), and an aileron 14.

Figure 4:
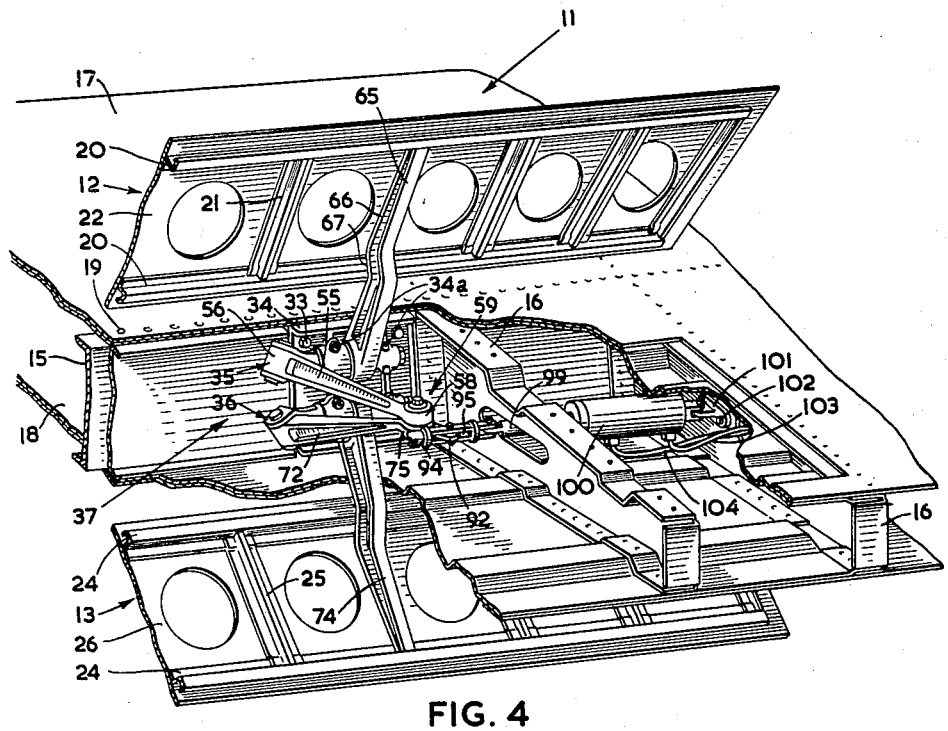
Figure 4 is a perspective view of an air brake actuating mechanism according to the invention.
Figure 5:
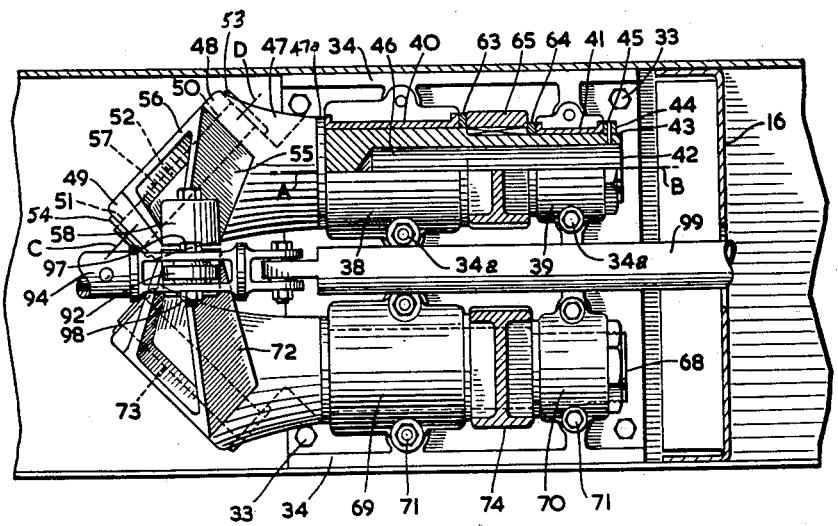
Figure 5 is a partly sectional rear elevation of the actuating mechanism shown in Figure 4.

Since the structure in each wing is identical, only that mechanism housed in the port wing will be described in this specification. Referring to Figures 4 and 5, the port wing 11 may be seen to have a rear main spar 15 and ribs 16. The upper skin 17 and the lower skin 18 are fastened to the spar 15 and the ribs 16 by rivets 19.

The upper air brake surface 12 on the port wing consists of a skin 22 riveted to a pair of Z-shaped flanges 20 extending in a generally spanwise direction in the wing 11. Secured to the flanges 20 are stringers 21 lying in a chordwise direction.

The lower air brake surface 13 is similar to the upper air brake surface 12 having flange 24, stringers 25 and a skin 26.

Fastened to the rear spar 15, adjacent the air brake surfaces 12 and 13, by bolts 33 is a mount 34 for a mechanism, generally shown at 37, that actuates the air brake surfaces 12 and 13. The mechanism 34 consists of a linkage 35 for actuating the upper air brake surface 12 and a linkage 36, similar to the linkage 35, for actuating the lower air brake surface 13. As the linkages 35 and 36 are similar only the linkage 35 will be fully described.

Fastened to the mount 34 by bolts 34a are two bearing housings 38 and 39 that are bored to receive anti-friction bearing shells, 40 and 41 respectively, that have a common axis A—B and are spaced from each other along this axis. Bearing shells are used in the embodiment shown for the sake of simplicity; however, it is obvious that other types of bearings, such as ball or roller bearings could be used.

The bearing shells 40 and 41 journal a shaft 42, which constitutes the first member of the linkage 35, for rotation about the axis A—B. The shaft 42 has an end 43 that is threaded to receive a nut 44 that abuts one end of the bearing housing 39 and prevents withdrawal of the shaft 42 from the bearing shells 40 and 41. The nut 44 and the shaft end 43 may be drilled to receive a pin 45 which locks the nut 44 against rotation relative to shaft 42. The shaft 42 may have a cylindrical drilling 46 extending inwardly from its threaded end 43 coaxial with the shaft 42 to reduce the weight of the shaft 42.

The other end of the shaft 42 has a bifurcated fitting 47 that is angularly disposed to the axis A—B of the shaft 42. The end of the bifurcated fitting 47 adjacent the shaft 42 has an annular flange 47a that abuts the bearing housing 38 and, together with the nut 44, keeps the shaft in the bearings 40 and 41. The other end of the fitting 47 has two prongs 48 and 49 with axially aligned bores 50 and 51 respectively.

Figure 2:
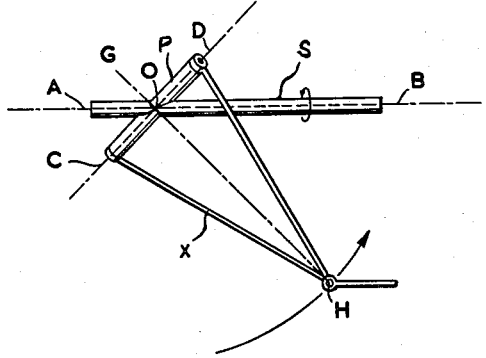
Figures 2 and 3 are schematic views of the geometry of an actuating mechanism according to the invention.
Figure 3:
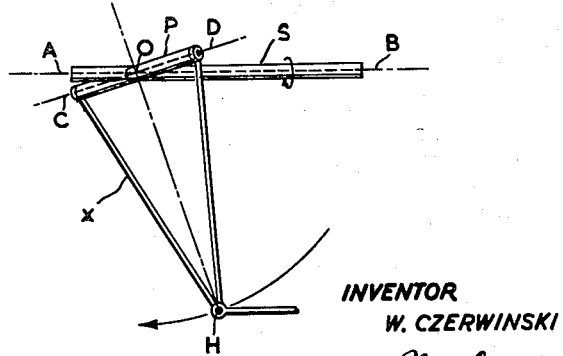

The bores 50 and 51 receive a pivot pin 52 that consists of a cylindrical body having an axis C—D inclined to the axis A—B of the shaft 42 at an angle of approximately 45°, the axis C—D intersecting the axis A—B at a point O (see Figures 2 and 3). In the preferred embodiment, the angle between axes A—B and C—D is approximately 45°. Geometrically, the angle may be any angle greater than 0° and less than 90° but in practice these limits may be reduced by design considerations. The pivot pin 52 has a head 53 at one end and a groove that receives a circlip 54 at the other end, the headed end 53 and the circlip 54 holding the pin 52 in the bores 50 and 51.

The pivot pin 52 pivotably mounts a first arm 55 on the shaft 42. A first lug end 56 of the arm 55 is between the prongs 48 and 49 of the bifurcated fitting 47 and is bored at 57 to receive the pivot pin 52. A second lug end 58 of the arm 55 is attached to a universal coupling, generally shown at 59, and is bored at 60 to receive a bolt 61, having an axis E—F (see Figure 6), which is part of the universal coupling. The arm 55 is twisted so that the axis E—F of the bolt 61 is perpendicular to the axis A—B of the shaft 42 and inclined to the axis C—D of the pivot pin 52. The arm 55 has an axis G—H (see Figures 2 and 3) that must always pass through the point of intersection O of the axes A—B of the shaft 42 and C—D of the pivot pin 52.

Splined on the shaft 42 between the bearings 40 and 41 but separated from them by shims 63 and 64 is a supporting strut 65 that extends from the shaft 42 in a radial direction. The arm 65 has a portion 66 fastened to the upper air brake surface 12 between the flanges 20 parallel to the stringers 21, the strut 65 being offset at 67 so that it passes over the flanges 20 of the upper air brake surface 12. With the air brake surface 12 fastened to the strut 65 in this manner, it can be raised or lowered by rotation of the shaft 42 to which the strut 65 is fastened.

The lower air brake surface 13 is actuated by the linkage 36 which is similar to the linkage 35 but which causes a downward movement of the lower air-brake surface 13. The linkage 36 has a shaft 68 that is journalled for rotation by bearing shells (not shown) in bearing housings 69 and 70 mounted on the fitting 34 by bolts 71, an arm 72 mounted on the shaft 68 by a pivot pin 73, and a supporting strut 74 splined onto the shaft 68 in a radial direction and on which the lower air brake surface 13 is mounted. Thus, the lower air brake surface 13 can be raised or lowered by rotation of the shaft 68.

The arm 72 has a lug end 75 at its end remote from the pivot pin 73. This lug end 75 is bored at 76 to receive the bolt 61 of the universal coupling 59. The bolt 61 and a nut 61a, which is threaded and locked, onto the bolt 61, connects the lug end 58 of the arm 55 of the linkage 35 and the lug end 75 of the arm 72 of the linkage 36 together. By having their ends connected together by the universal coupling 59 so that their longitudinal axes intersect, the arms 55 and 72 are constrained to form a stable triangle of forces with the mounting fitting 34 and thus keep the point of intersection of their axes always in a plane parallel to the axis A—B of shaft 42.

Figure 6:
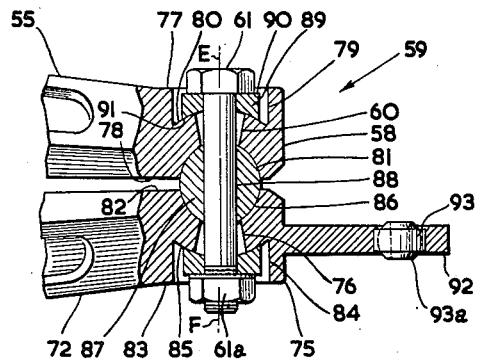
Figure 6 is an enlarged sectional side view of the universal coupling of the actuating mechanism of Figure 4.

Details of the universal coupling 59 can be seen in Figure 6 which shows the lug end 58 of the arm 55 to have a spotfaced top surface 77 and a spotfaced bottom surface 78 parallel to the surface 77. The bore 60 extends inwardly from the top surface and is tapered as it extends towards the bottom surface 78. The bore 60 has a counterbore 79, having a convex bottom surface 80 the centre of curvature of which is on the axis E—F of the bolt 61, extending inwardly from the top surface 77, and an arcuate countersink 81, the centre of curvature of the arcuate countersink 81 being the same as the centre of curvature of the convex bottom surface 80 of the counterbore 79, extending inwardly from the bottom surface 78 of the lug end 58.

The lug end 75 of the arm 72 is similar to the lug end 58 of the arm 55 and has a spotfaced upper surface 82 and a spotfaced lower surface 83 parallel to the surface 82. The bore 76 extends inwardly from the lower surface 83 and is tapered as it extends towards the upper surface 82. The bore 76 has a counterbore 84 extending inwardly from the bottom surface 83, the counterbore having a convex bottom surface 85, and an arcuate countersink 86 extending inwardly from the upper surface 82. The centre of curvature of the bottom surface 85 of the counterbore 84 is the same as the centre of curvature for the arcuate countersink 86 and is on the axis E—F of the bolt 61.

The surfaces of the arcuate counterbores 81 and 86 are highly polished to form bearing surfaces for a highly polished ball 87 which is bored at 88 to receive the bolt 61.

Each of the counterbores 79 and 84 receives a washer 89, a washer for the head of the bolt 61 and another washer for the nut 61a, with a plane surface 90 and a concave surface 91, each washer 89 having its concave surface lying against the convex bottom surface 80 and 85 of the counterbores 79 and 84.

The lug end 75 of the arm 72 has a lug 92, with a bore 93, extending from it perpendicular to the axis E—F of the bolt. The bore 93 of lug 92 is provided with a self aligning bearing 93a. The lug 92 is connected to a push-pull control rod 94, having a slotted portion 95 to receive the lug 92, which is secured in the slot by a bolt 97 and a nut 98.

The push-pull rod 94 is pivotally connected to a ram 99 of a piston (not shown) in a hydraulic cylinder 100 pivotally mounted on a lug fitting 101, which in turn, is attached to one of the ribs 16 by bolts 102. Hydraulic fluid is fed to the cylinder 100 by conduits 103 and 104, one conduit being attached to each end of the cylinder 100.

By referring to Figures 2 and 3, the operation of a linkage such as 35 and 36 can easily be seen. These figures show a cylindrical shaft S, representing the first member 42 and having an axis A—B about which it is rotatable and to which an arm X, representing the first arm 55, is mounted by a pivot P representing pin 52 with an axis C—D. The arm X has a longitudinal axis H—G. The axis C—D is inclined to the axis A—B at an angle of less than 90° but greater than 0°. The axes A—B, C—D and H—G all pass through a single point O. The arm X has an end H remote from the pivot C—D pivotally attached to a control rod that is linearly movable. Movement of this rod causes the arm X to rotate about the axis C—D which in turn causes the shaft S to rotate about its axis. Thus, linear movement of the control rod will cause a strut (not shown) mounted on the shaft S so as to extend radially outwardly from it to be raised and lowered.

Means must be provided to keep the axis H—G of the arm X in a plane containing the axis A—B of the shaft. These means (not shown in Figures 2 and 3) may take the form of a guide (as in the embodiment shown in Figure 7) or of a second linkage similar to the first linkage and attached to the first linkage by a universal coupling (as in the embodiment shown in Figures 4, 5 and 6) to provide a stable triangle of forces.

Figure 7:
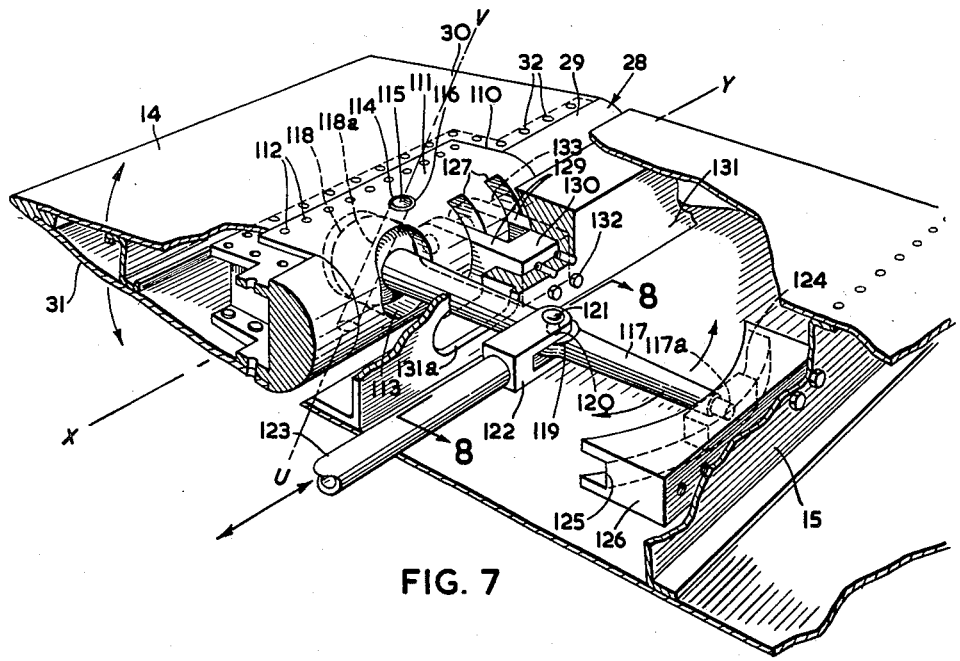
Figure 7 is a perspective view, partly broken away, of an alternate embodiment of the invention showing an aileron actuating mechanism according to the invention.
Figure 8:
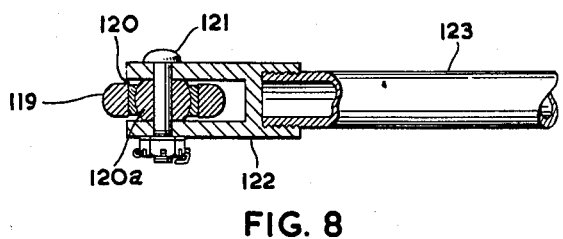
Figure 8 is a sectional view along line 8—8 of Figure 7.

Control of the aileron 14, which is journalled for rotation about its hinge line X—Y, will now be described with reference to Figures 7 and 8.

The aileron 14 has a channel-shaped spar 28 with an arcuate leading edge 29 the centre of curvature of which is on a line X—Y which is also the hinge line of the aileron 14. The spar 28 has an upper skin 30 and a lower skin 31 fastened to it by rivets 32. The spar 28 has a rectangular recess 110 extending into it from the arcuate leading edge 29 to receive a generally rectangular fitting 111 with an arcuate leading edge that conforms with the arcuate leading edge 29 of the spar, the fitting 111 being fastened to the spar 28 by screws 112. A large bore 113 extends into the fitting 111 from its leading edge while a bore 114, having an axis U—V, extends into the fitting 111 from its top surface, through the bore 113, and then a substantial distance into the fitting. The axis U—V preferably is inclined to the hinge line X—Y at an angle of 45° and lies in a plane containing axis X—Y. A pivot pin 115 is retained in the bore 114 by an internal circlip 116 recessed in the fitting 111 adjacent its top surface. Mounted to the fitting 111 by the pivot pin 115 is a first arm 117 with a ball end 118 bored at 118a to receive the pivot pin 115.

The arm 117 is of a generally frusto-conical configuration and has a longitudinal axis which passes through that point at which the hinge line X—Y and the axis U—V intersect. On the arm 117 is a cylindrical portion 119 extending perpendicular to the arm and having a bore 120 through it, to receive a bolt 121 which pivotally attaches a forked-end 122 of a push-pull control rod 123 to the arm 117 so that linear motion of the control rod 123 causes the arm 117 to rotate about the pivot pin 115. Because there is a slight torsional movement of the arm 117 as it rotates about the pivot pin 115, it is desirable to provide the bore 120 with a self aligning bearing as shown in Figure 8 at 120a.

The end of the arm 117 remote from the ball end 118 has a short coaxial pin 117a upon which is rotatably mounted a guide block 124 that may slide in an arcuate guide slot 125 of a fitting 126 fastened to the rear main spar 15 of the wing 11. The centre of curvature of the guide slot 125 is the point of intersection of the hinge line X—Y, the axis U—V of the pivot pin, and the longitudinal axis of the arm 117. The guide slot 125 retains the longitudinal axis of the arm 117 in a plane containing the hinge line X—Y of the aileron when the arm 117 is rotated about the pivot pin 115 by linear movement of the control rod 123.

The fitting 111 also has two slots 127 extending inwardly from the arcuate leading edge 29 at right angles to the hinge line X—Y. Extending into each slot 127 is a finger 129 of a hinge fitting 130 mounted on a spar 131 by screws 132. The spar 131 is provided with a cutout 131a through which the arm 117 passes. The fingers 129 are bored to receive a pivot pin 133 that is also received in a bore in the fitting 111 so that the aileron 14 is pivotally mounted on the wing for rotation about the hinge line X—Y.

The principal operation of this embodiment of the invention is identical to that which has been previously described with reference to Figures 2 and 3. The aileron 14 corresponds to member S rotatable about the axis A—B, the pivot pin 115 to member P having an axis C—D, and the arm 117 to member X having the axis H—G.

What I claim as my invention is:

1. A mechanical linkage for converting reciprocation in one member to angular displacement in opposite directions in two members comprising: two spaced parallel shafts journalled for rotation about two spaced parallel axes lying in a common plane, two arms, one associated with each shaft, each arm being pivotally secured to its associated shaft by a pivot having an axis of rotation forming an included angle of less than 90° but greater than 0° with the axis of rotation of the shaft, the axes of rotation of the two pivots intersecting at an angle of less than 180° but greater than 0°, each arm having a longitudinal axis which intersects with the axis of its pivot and the axis of rotation of the shaft with which it is associated at a common point, the ends of the arms remote from their pivots being secured together so that their axes intersect, the axes of the arms, together with a line joining the point of intersection of the axis of one pivot and the axis of rotation of the associated shaft and the point of intersection of the other pivot and the axis of the other shaft forming a triangle, and means capable of reciprocation associated with the arms to move the point of intersection of their axes through an arc in a plane normal to the common plane containing the axes of the two shafts.

2. A mechanical linkage for converting reciprocation in one member to angular displacement in opposite directions in two members comprising: two spaced parallel shafts journalled for rotation about two spaced parallel axes lying in a common plane, two arms, one associated with each shaft, each arm being pivotally secured to its associated shaft by a pivot having an axis of rotation forming an included angle of less than 90° but greater than 0° with the axis of rotation of the shaft, the axes of rotation of the two pivots intersecting at an angle of less than 180° but greater than 0°, each arm having a longitudinal axis which intersects with the axis of its pivot and the axis of rotation of the shaft with which it is associated at a common point, the ends of the arms remote from their pivots being secured together so that their axes intersect by means of a universal coupling permitting limited rotation of the arms about their longitudinal axes, the axes of the arms, together with a line joining the point of intersection of the axis of one pivot and the axis of rotation of the associated shaft and the point of intersection of the other pivot and the axis of the other shaft forming a triangle and means capable of reciprocation associated with the arms to move the point of intersection of their axes through an arc in a plane normal to the common plane containing the axes of the two shafts.

3. A mechanical linkage for converting reciprocation in one member to angular displacement in opposite directions in two members comprising: two spaced parallel shafts journalled for rotation about two spaced parallel axes lying in a common plane, two arms, one associated with each shaft, each arm being pivotally secured to its associated shaft by a pivot having an axis of rotation forming an included angle of less than 90° but greater than 0° with the axis of rotation of the shaft, the axes of rotation of the two pivots intersecting at an angle of less than 180° but greater than 0°, each arm having a longitudinal axis which intersects with the axis of its pivot and the axis of rotation of the shaft with which it is associated at a common point, the ends of the arms remote from their pivots being secured together so that their axes intersect by means of a universal coupling permitting limited rotation of the arms about their longitudinal axes, the axes of the arms, together with a line joining the point of intersection of the axis of one pivot and the axis of rotation of the associated shaft and the point of intersection of the other pivot and the axis of the other shaft forming a triangle and a control rod capable of reciprocation in a direction parallel to the axes of the shafts and connected to the universal coupling joining the two arms to move the point of intersection of their axes through an arc in a plane normal to the common plane containing the axes of the two shafts.

4. In an aircraft wing a mechanical linkage for converting reciprocation in one member spanwise of the wing to angular displacement in opposite directions in two control surfaces carried by a fixed portion of the wing comprising: two spaced parallel shafts lying spanwise of the wing and journalled for rotation about two spaced parallel axes lying in a common plane, a control surface operatively connected to and extending in a generally radial direction from each shaft, two arms, one associated with each shaft, each arm being pivotally secured to its associated shaft by a pivot having an axis of rotation forming an included angle of less than 90° but greater than 0° with the axis of rotation of the shaft, the axes of rotation of the two pivots intersecting at an angle of less than 180° but greater than 0°, each arm having a longitudinal axis which intersects with the axis of its pivot and the axis of rotation of the shaft with which it is associated at a common point, the ends of the arms remote from their pivots being secured together so that their axes intersect by means of a universal coupling permitting limited rotation of the arms about their longitudinal axes, the axes of the arms, together with a line joining the point of intersection of the axis of one pivot and the axis of rotation of the associated shaft and the point of intersection of the other pivot and the axis of the other shaft forming a triangle and a control rod capable of reciprocation in a direction parallel to the axes of the shafts and connected to the universal coupling joining the two arms to move the point of intersection of their axes through an arc in a plane normal to the common plane containing the axes of the two shafts.

5. In an aircraft wing, a mechanical linkage for converting reciprocation in one member spanwise of the wing to angular displacement in opposite directions in two control surfaces carried by a fixed portion of the wing comprising: two spaced parallel shafts lying spanwise of the wing and journalled for rotation about two spaced parallel axes lying in a common plane, two first arms, one rigidly secured to and extending generally radially of one end of each shaft, a control surface secured to each first arm, the other end of each shaft having a bifurcation including a pair of spaced parallel legs angularly oriented with respect to the axis of rotation of the shaft, two second arms, one associated with each shaft, each arm being pivotally secured to its associated shaft by having one end received in the bifurcation in that shaft and held by a pivot pin passing through a bore in the legs of the bifurcation and in the one end of the second arm, the pivot pin having an axis of rotation forming an included angle of less than 90° but greater than 0° with the axis of rotation of the shaft, the axes of rotation of the two pivots intersecting at an angle of less than 180° but greater than 0°, each second arm having a longitudinal axis which intersects with the axis of its pivot and the axis of rotation of the shaft with which it is associated at a common point, the ends of the second arms remote from their pivots being secured together so that their axes intersect by means of a universal coupling permitting limited rotation of the arms about their longitudinal axes, the axes of the second arms, together with a line joining the point of intersection of the axis of one pivot and the axis of rotation of the associated shaft and the point of intersection of the other pivot and the axis of the other shaft forming a triangle, and a control rod capable of reciprocation in a direction parallel to the axes of the shafts and connected to the universal coupling joining the two second arms to move the point of intersection of their axes through an arc in a plane normal to the common plane containing the axes of the two shafts.

6. In an aircraft wing, a mechanical linkage as claimed in claim 5 in which the adjacent faces of the legs of the bifurcations are parallel, and perpendicular to the axis of the pivot pin and are spaced so as to locate the end of the second arm received therein with its axis intersecting the axis of the pivot pin and the axis of rotation of the shaft at a common point.

References Cited in the file of this patent

UNITED STATES PATENTS

| | | |
|---|---|---|
| 2,258,517 | Rose | Oct. 7, 1941 |
| 2,383,845 | Couzinet | Aug. 28, 1945 |
| 2,471,283 | Parker | May 24, 1949 |
| 2,503,159 | Lane | Apr. 4, 1950 |
| 2,763,449 | Fullam et al. | Sept. 18, 1956 |
| 2,824,454 | Rider | Feb. 25, 1958 |
| 2,871,710 | Sakagami | Feb. 3, 1959 |

FOREIGN PATENTS

| | | |
|---|---|---|
| 878,881 | Germany | June 8, 1953 |